United States Patent
Casey et al.

(10) Patent No.: US 8,270,319 B2
(45) Date of Patent: Sep. 18, 2012

(54) METHOD AND APPARATUS FOR EXCHANGING ROUTING INFORMATION AND ESTABLISHING CONNECTIVITY ACROSS MULTIPLE NETWORK AREAS

(75) Inventors: Liam M. Casey, Ottawa (CA); David Ian Allan, Ottawa (CA); Nigel Lawrence Bragg, Cambridgeshire (GB); Jerome Chiabaut, Ottawa (CA)

(73) Assignee: Rockstart Bidco, LP, New York, NY (US)

( * ) Notice: Subject to any disclaimer, the term of this patent is extended or adjusted under 35 U.S.C. 154(b) by 382 days.

(21) Appl. No.: 12/575,190

(22) Filed: Oct. 7, 2009

(65) Prior Publication Data
US 2010/0020797 A1   Jan. 28, 2010

Related U.S. Application Data

(63) Continuation-in-part of application No. 11/899,118, filed on Sep. 4, 2007.

(60) Provisional application No. 60/874,806, filed on Dec. 14, 2006, provisional application No. 60/874,890, filed on Dec. 14, 2006.

(51) Int. Cl.
*H04L 12/28* (2006.01)
*H04L 12/56* (2006.01)

(52) U.S. Cl. .................. 370/256; 370/390; 370/401

(58) Field of Classification Search ............... None
See application file for complete search history.

(56) References Cited

U.S. PATENT DOCUMENTS

| | | | |
|---|---|---|---|
| 5,917,820 A | 6/1999 | Rekhter | |
| 6,526,054 B1 * | 2/2003 | Li et al. | 370/390 |
| 6,963,575 B1 | 11/2005 | Sistanizadeh et al. | |
| 7,076,594 B2 * | 7/2006 | Benedetto et al. | 710/316 |
| 7,318,108 B2 * | 1/2008 | Sreekantiah et al. | 709/242 |
| 7,397,802 B2 * | 7/2008 | Maeno | 370/395.31 |
| 7,412,557 B2 * | 8/2008 | Di Benedetto et al. | 710/316 |

(Continued)

FOREIGN PATENT DOCUMENTS
WO   2008076201 A1   6/2008

OTHER PUBLICATIONS

International Search Report and Written Opinion dated Jan. 14, 2011 for International Application No. PCT/CA2010/001587, International Filing Date: Oct. 6, 2010 consisting of 9-pages.

(Continued)

*Primary Examiner* — Gregory Sefcheck
(74) *Attorney, Agent, or Firm* — Christopher & Weisberg, P.A.

(57) ABSTRACT

A method ensures that multicast packets follow the same loop-free path followed by unicast packets in a packet communication network. The communication network includes at least one first area interconnected through at least one area border node ("ABN") to a second area. Each ABN has a first level port connected to each first area and a second level port connected to the second area. Each multicast packet forwarded includes a header having a root-id identifying a root of a multicast tree. A data packet is received at an ABN. Responsive to receiving a multicast packet at a second level port of an area border node, the root-id of the multicast packet is examined and if the multicast packet is to be forwarded over at least one of the first level ports, a different root-id is substituted into the packet before the packet is forwarded over the first level port.

20 Claims, 5 Drawing Sheets

U.S. PATENT DOCUMENTS

| | | | | |
|---|---|---|---|---|
| 7,558,877 B1* | 7/2009 | Fedyk et al. | | 709/242 |
| 7,623,474 B2* | 11/2009 | Tran et al. | | 370/255 |
| 7,626,984 B2* | 12/2009 | Napierala | | 370/389 |
| 7,653,011 B2* | 1/2010 | Rahman et al. | | 370/256 |
| 7,688,756 B2* | 3/2010 | Allan et al. | | 370/254 |
| 7,693,073 B2* | 4/2010 | Soja-Molloy et al. | | 370/238 |
| 7,739,404 B2* | 6/2010 | Li | | 709/242 |
| 7,760,668 B1* | 7/2010 | Zinjuvadia | | 370/256 |
| 7,768,995 B2* | 8/2010 | Yang et al. | | 370/351 |
| 7,774,461 B2* | 8/2010 | Tanaka et al. | | 709/224 |
| 7,855,950 B2* | 12/2010 | Zwiebel et al. | | 370/216 |
| 7,899,049 B2* | 3/2011 | Raj et al. | | 370/390 |
| 7,911,981 B2* | 3/2011 | Park et al. | | 370/256 |
| 7,969,978 B2* | 6/2011 | Napierala | | 370/389 |
| 8,059,647 B2* | 11/2011 | Ashwood-Smith et al. | | 370/390 |
| 8,130,644 B2* | 3/2012 | Tanaka et al. | | 370/230.1 |
| 2002/0150094 A1 | 10/2002 | Cheng et al. | | |
| 2007/0086361 A1* | 4/2007 | Allan et al. | | 370/254 |
| 2007/0124498 A1* | 5/2007 | Kaluve et al. | | 709/242 |
| 2007/0165657 A1* | 7/2007 | Smith et al. | | 370/401 |
| 2007/0253416 A1* | 11/2007 | Raj | | 370/390 |
| 2008/0095160 A1* | 4/2008 | Yadav et al. | | 370/390 |
| 2008/0101360 A1* | 5/2008 | Napierala | | 370/390 |
| 2008/0107027 A1* | 5/2008 | Allan et al. | | 370/235 |
| 2009/0201937 A1 | 8/2009 | Bragg et al. | | |
| 2011/0032936 A1* | 2/2011 | Ashwood-Smith et al. | | 370/390 |

OTHER PUBLICATIONS

Viswanathan et al., "Evolution of Multi-Protocol Label Switching," In: Communications Magazine, IEEE, vol. 36, Issue 5, May 1998 pp. 165-173, Digital Object Identifier 10.1109/35.668287.

* cited by examiner

METHOD AND APPARATUS FOR EXCHANGING ROUTING INFORMATION AND ESTABLISHING CONNECTIVITY ACROSS MULTIPLE NETWORK AREAS

CROSS REFERENCE TO RELATED APPLICATIONS

This application is a Continuation-in-Part of U.S. patent application Ser. No. 11/899,118 entitled "Method and Apparatus for Exchanging Routing Information and the Establishment of Connectivity Across Multiple Network Areas" filed Sep. 4, 2007, which claims priority to U.S. Provisional Patent Application No. 60/874,806, filed Dec. 14, 2006, entitled "Hierarchical Routing for PLSB," and U.S. Provisional Patent Application No. 60/874,890, filed Dec. 14, 2006, entitled "Recursive Provider Link State Bridging", the content of each of which is hereby incorporated herein by reference.

STATEMENT REGARDING FEDERALLY SPONSORED RESEARCH OR DEVELOPMENT n/a

FIELD OF THE INVENTION

The present invention relates to Ethernet networks and, more particularly, to a method and apparatus for exchanging routing information and the establishment of connectivity across multiple network areas.

BACKGROUND

In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, most if not all of the traffic would follow the links that were part of the spanning tree. This often led to over-utilization of the links that were on the spanning tree and non-utilization of the links that weren't part of the spanning tree.

To overcome some of the limitations inherent in Ethernet networks, a link state protocol controlled Ethernet network was disclosed in U.S. patent application Ser. No. 11/537,775, filed Oct. 2, 2006, entitled "Provider Link State Bridging," the content of which is hereby incorporated herein by reference. As described in greater detail in that application, the nodes in a link state protocol controlled Ethernet network exchange "hello" messages to learn adjacencies of other nodes on the network, and transmit "link state advertisement" messages to enable each node on the network to build a link state database. Included in link state packets is a metric associated with the link being advertised. Conventionally, this metric is interpreted as a distance. The link state database may then be used to compute shortest paths through the network. Each node then populates a Forwarding Information Base (FIB) which will be used by the node to make forwarding decisions so that frames will be forwarded over the computed shortest path to the destination. Since the shortest path to a particular destination is always used, the network traffic will be distributed across a larger number of links and follow a more optimal path for a larger number of nodes than where a single Spanning Tree or even multiple spanning trees are used to carry traffic on the network.

When customer traffic enters a provider network, a customer frame's destination MAC address (C-MAC DA) is resolved to a provider MAC address (B-MAC DA), so that the provider may forward traffic on the provider network using the provider MAC address space. Additionally, the network elements on the provider network are configured to forward traffic based on a Virtual LAN ID (VID) so that different frames addressed to the same destination address but having different VIDs may be forwarded over different paths through the network. In operation, a link state protocol controlled Ethernet network may associate one VID range with shortest path forwarding, such that unicast and multicast traffic may be forwarded using a VID from that range, and traffic engineering paths may be created across the network on paths other than the shortest path, and forwarded using a second VID range. The use of Traffic Engineered (TE) paths through a link state protocol controlled Ethernet network is described in greater detail in U.S. patent application Ser. No. 11/732,381, filed Apr. 3, 2007, entitled "Engineered Paths In A Link State Protocol Controlled Ethernet Network", the content of which is hereby incorporated herein by reference.

Link state routing protocols include Open Shortest Path First (OSPF) and intermediate system to intermediate system (IS-IS). These link state networks can only scale up to the point where the reconvergence time for the link state control plane becomes unacceptable due to the complexity of the required computation, which grows exponentially in proportion to network size. To get past that point, link state protocols partition networks into areas. Both IS-IS and OSPF are confined to a two level hierarchy: a single backbone area (Level 2 in IS-IS) with subtending Level 1 (L1) stub areas.

In Provider Link State Bridging (PLSB), which applies the IS-IS protocol to bridges in Providers' Ethernet networks, the bridge that interconnects two (or more) areas is called an Area Border Bridge (ABB). For reliability, it is desirable that there be multiple ABBs between any L1 area and the single Level 2 (L2) area. The operation of the IS-IS protocol in IP networks is known in the art. However, there are significant differences between Internet Protocol (IP) and PLSB which cause the tried and true ways that IP traffic is directed between areas to not a ways apply for PLSB. For example, IP is based on subnets, so the test as to whether to forward a packet toward an area border router is simple.

IP is connectionless, so forwarding a packet toward the closest Area Border Router (ABR), the IP network equivalent of the closest ABB, will always work. IP does not require path symmetry so a packet can leave an area by one ABB and the reverse packet can arrive by another ABB, whereas, for reasons relating to Ethernet multicast and to operational instrumentation, in PLSB, the path between two endpoints must be the same for both directions. Also, IS-IS for IP and OSPF protocols do not support multicast routing, while multicast trees are an essential part of PLSB. For Ethernet, it is desirable (and mandatory for the design of PLSB) that multicast packets must follow the same routes as the unicast packets transmitted to the same destinations.

Currently, the IS-IS protocol allows a link to be in both an L1 area and an L2 area, but PLSB provides no indication for an ABB to determine if an incoming packet should be treated as arriving from L1 or from L2 in determining its next hop.

There is also no provision to handle the scenario where a single ABB serves multiple disjoint L1 areas.

Therefore, what is needed is a system and method for loop-free forwarding of packets in a multi-area PLSB network where L1 areas may be served by multiple ABBs and a single ABB may serve multiple areas.

SUMMARY OF THE INVENTION

The present invention advantageously provides a method, apparatus and system for ensuring that multicast packets follow a same loop-free path as a path followed by unicast packets in a packet communication network. Generally, for packet communication networks where any Level (L1) area may be served by multiple area border bridges (ABBs), a single forwarding information base (FIB) is insufficient. The present invention provides for the use of separate and distinct FIBs dependent upon whether a packet arrives on an L1 port or a Level 2 (L2) port.

In accordance with one aspect of the present invention, a method is provided for ensuring that multicast packets follow the same loop-free path as followed by unicast packets in a packet communication network. The packet communication network includes at least one first area defined by a first level. Each first area includes a first plurality of nodes interconnected by a first set of links. Each first area is interconnected through at least one area border node to a second area defined by a second level. The second area includes a second plurality of nodes interconnected by a second set of links. Each area border node includes at least one first level port connected to each first area and a second level port connected to the second area. Each multicast packet forwarded over the loop-free path including a header having a root-id identifying a root of a multicast tree. At least one data packet is received at an area border node Responsive to receiving a multicast packet at a second level port of an area border node, the root-id of the multicast packet is examined. If multicast packet is to be forwarded on at least one of the first level ports of the area border node, a different root-id is substituted into the packet before forwarding the packet over the at least one first level port.

In accordance with another aspect of the present invention, an area border node is provided for use in a packet communication network. The packet communication network includes at least one first area defined by a first level. Each first area includes a first plurality of nodes interconnected by a first set of links. Each first area is interconnected to a second area defined by a second level. The second area includes a second plurality of nodes interconnected by a second set of links. The area border node includes at least one first level port corresponding to each first area, a second level port corresponding to the second area, and at least one processor. The first level port is operable to receive data packets from and transmit data packets to its corresponding first area. The second level port is operable to receive data packets from and transmit data packets to the second area. At least one processor is electrically connected to each first level port and to the second level port. Responsive to receiving a multicast packet at a second level port which includes a header having a root-id identifying a root of a multicast tree, the at least one processor is operable to examine the root-id of the multicast packet and determine whether the multicast packet is to be forwarded on at least one of the first level ports of the area border node. If the multicast packet is to be forwarded over at least one of the first level ports, the processor substitutes a different root-id into the packet before initiating forwarding of the packet over the first level port.

In accordance with yet another aspect of the present invention, a packet communication system includes a second area, at least one first area, and at least one area border node. The at least one first area is interconnected to the second area. The second area and each first area are configured as an link state protocol controlled Ethernet network area and include a plurality of nodes interconnected by a set of links. At least one area border node interconnects each first area to the second area and is operable to serve two or more disjoint first areas. Each area border node includes a second level port, at least one first level port and at least one processor. The second port is operable to receive data packets from and transmit data packets to the second area. Each first level port is operable to receive data packets from and transmit data packets to the its corresponding first area. At least one processor is electrically connected to the second level port and to each first level port. Responsive to receiving a multicast packet at a second level port which includes a header having a root-id identifying a root of a multicast tree, the processor is operable to examine the root-id of the multicast packet and determine whether the multicast packet is to be forwarded on at least one of the first level ports of the area border node. If the multicast packet is to be forwarded over at least one of the first level ports, a processor substitutes a different root-id into the packet before initiating forwarding of the packet over the first level port.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

IEEE standard 802.1ah-2008, Provider Backbone Bridges, by defining a new Ethernet header informally known as "MAC in MAC", provides for the complete separation of customer and provider Ethernet addressing and allows a provider network to offer large numbers of customer service instances, such as customer instances of Transparent LAN service. Using a link state protocol with 802.1ah to control a provider's Ethernet backbone network enables the Ethernet network to be scaled from the LAN space to the MAN, and to the WAN, by providing more efficient use of network capacity with loop-free shortest path forwarding. Rather than utilizing a learned network view at each node by using the Spanning Tree Protocol (STP) algorithm combined with transparent bridging, in a link state protocol controlled Ethernet network the bridges forming the mesh network exchange link state advertisements to enable each node to have a synchronized view of the network topology. This is achieved via the well understood mechanism of a link state routing system. The bridges in the network have a synchronized view of the network topology, have knowledge of the requisite unicast and multicast connectivity, can compute a shortest path connectivity between any pair of bridges in the network, and individually can populate their forwarding information bases (FIBs) according to the computed view of the network.

When all nodes have computed their role in the synchronized network view and populated their FIBs, the network will have a loop-free unicast tree to any given bridge from the set of peer bridges (those that require communication to that bridge for whatever reason); and a both congruent and loop-free point-to-multipoint (p2mp) multicast tree from any given bridge to the same set or subset of peer bridges per service instance hosted at the bridge. The result is the path between a given bridge pair is not constrained to transiting the root bridge of a spanning tree and the overall result can better utilize the breadth of connectivity of a mesh. In essence every bridge is the root of one or more spanning trees which define unicast connectivity to that bridge, and multicast connectivity from that bridge.

Link state protocol controlled Ethernet networks provide the equivalent of Ethernet bridged connectivity, but achieve this via configuration of the network element FIBs rather than by flooding and learning. As such it can be used by emerging standards such as IEEE (Institute of Electrical and Electronics Engineers) 802.1ah draft standard entitled Provider Backbone Bridging or MAC-in-MAC with configured forwarding of B-MACs (Backbone MAC) and trivial modifications to the BEB adaptation function, to map client broadcast behavior to multicast, such that client Ethernets can utilize the connectivity offered by the link state protocol controlled Ethernet network without modification. MAC configuration may be used to construct shortest path loop-free connectivity (for both unicast and multicast purposes) between a set of (slightly modified) 802.1ah provider backbone bridges in order to provide transparent LAN service to the C-MAC (Customer MAC) layer or other layer networks that can use a transparent LAN service.

Figure 1:
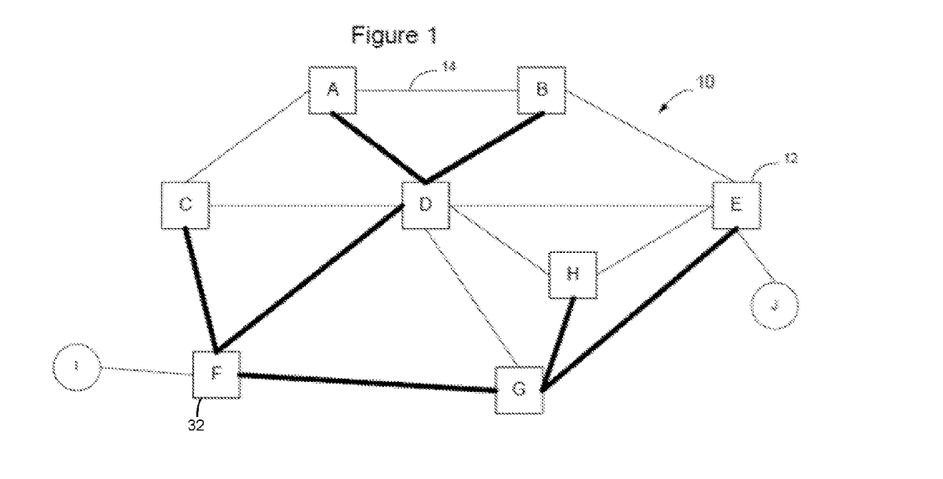
FIG. 1 is a functional block diagram of an example link state protocol controlled Ethernet network.

Referring now to the drawing figures in which like reference designators refer to like elements, FIG. 1 shows a functional block diagram of an example of a portion of a link state protocol controlled Ethernet network 10. As shown in FIG. 1, the network 10 in this example includes a plurality of bridge nodes 12, interconnected by links 14. The bridge nodes 12 exchange "hello" messages to learn adjacencies of other nodes, and exchange link state advertisements to enable each node to build a link state database that may be used to calculate shortest paths between ingress and egress nodes through the network. Additional details associated with an example link state protocol controlled Ethernet network are provided in U.S. Pat. No. 11/537,775, filed Oct. 2, 2006, entitled "Provider Link State Bridging" the content of which is hereby incorporated herein by reference.

Two examples of link state routing protocols include Open Shortest Path First (OSPF) and Intermediate System to Intermediate System (IS-IS), although other link state routing protocols may be used as well. IS-IS is described, for example, in ISO 10589, and IETF RFC 1195, the content of each of which is hereby incorporated herein by reference. Although there are current versions of this protocol, the invention is not limited to an implementation based on the current version of the standard as it may be adapted to work with future versions of the standard as they are developed. Similarly, the invention is not limited to an implementation that operates in connection with one of these particular protocols as other protocols may be used to exchange routing information as well.

In addition to installing shortest path unicast forwarding state, the nodes may also install forwarding state for multicast trees on the network. An example of a way to implement multicast in a link state protocol controlled Ethernet network is described in greater detail in U.S. patent application Ser. No. 11/702,263, filed Feb. 5, 2007, entitled "Multicast Implementation in a Link State Protocol Controlled Ethernet Network" the content of which is hereby incorporated herein by reference. As described in that application, link state advertisements may be used to advertise multicast group membership to cause forwarding state for a multicast group to be installed on the network. In particular, each tree root for a given multicast group may be assigned a unique identifier, e.g., a root-id, that is used as the destination MAC Address (DA) for forwarding the multicast frames on the network. The nodes on the network install forwarding state for the root/group tree if they happen to be on a shortest path from the multicast root to one of the destination nodes advertising via linkstate "receive interest" in the multicast group. In FIG. 1, a multi-cast tree having a root at the node F is shown when the destination nodes (A,B,C,E and H) have a receive interest in a one or more multicast groups that has a member at F. Node D, for example, installs itself in the tree (installs forwarding state for the root) because it is on the shortest path between Node F and Node A.

Interest in a multicast may be based on the community of interest identifier such as the I-SID, such that a node on the network will install forwarding state for a multicast group when it is on a shortest path between a source and destination that have both advertised interest in the community of interest identifier associated with the multicast group. The forwarding state, however, is based on the multicast destination address (DA) and Virtual LAN ID (VID) associated with the multicast. In operation, when an interior node receives a frame it will perform a lookup in its Forwarding Information Base (FIB) based on the DA and VID associated with the frame, and forward the frame accordingly. As mentioned above, although an embodiment of the invention will be described in which the I-SID is used as a community of interest identifier, the invention is not limited to this embodiment as other types of community of interest identifiers may also be used.

Traffic engineering may be used to create paths that do not necessarily follow only the shortest path on a link state protocol controlled Ethernet network. Forwarding state for the traffic engineering paths may be differentiated from forwarding state that was installed in connection with implementation of the shortest path routing protocol by identifying the traffic engineering forwarding state using a different VID. One way of creating traffic engineering paths through a link state protocol controlled Ethernet network is disclosed in U.S. patent application Ser. No. 11/732,381, filed Apr. 3, 2007, entitled "Engineered Paths In A Link State Protocol Controlled Ethernet Network," the content of which is hereby incorporated herein by reference.

When a frame arrives at a network element, for example if customer network element I were to transmit a frame to customer network element J, the frame will be received at the provider network element F. Network element F will determine if it knows which of the nodes on the provider network are able to reach the customer MAC address of destination node J (C-MAC). If F has already learned that provider network element E is able to reach customer network element J, network element F will add a MAC header to perform Mac-in-Mac encapsulation of the customer frame. The outer header will include the destination MAC address of network element E to cause the frame to be forwarded on the network.

Similarly, where the frame is a multicast frame the provider network element F will determine the provider multicast DA that should be used to transmit the frame on the provider network. The ingress network element F will then transmit the frame across the provider network using shortest path forwarding or, alternatively, using any available traffic engineered path through the network. The ingress node performs C-MAC→B-MAC resolution and encapsulates the client frame using a new MAC header such that the resultant encapsulated frame is addressed using the B-MAC addressing space. MAC-in-MAC encapsulation is well known in the art and a detailed description of the processes involved in this type of encapsulation will therefore not be provided.

Where ingress node F does not know which provider node is able to reach customer node J, the ingress node will simply use the multicast tree associated with the community of interest (or I-SID) to flood the packet to all other Backbone Edge Bridges (BEBs) in the community of interest. Any subsequent message from J will permit F to learn which provider DA to use for the outer MAC header. Optionally, a distributed HASH table may be used to store the C-MAC to B-MAC correlations so that the ingress node may transmit a query to one or more nodes implementing the distributed HASH table rather than broadcasting an address resolution request. One way of implementing a distributed HASH table is disclosed in U.S. patent application Ser. No. 11/714,508, filed Mar. 6, 2007, entitled "Distributed Storage of Routing Information in a Link State Protocol Controlled Ethernet Network", the content of which is hereby incorporated herein by reference.

As the network increases in size, and larger numbers of nodes are included in the network, it may be desirable to divide the network into two or more smaller areas. This allows the control plane and associated network database to be separated into two or more instances, so that the detailed routing updates may be contained within the smaller network area and changes within one area do not perturb the adjacent areas. This is advantageous as the number of link state advertisements may be reduced, the size of the link state databases may be reduced, and the overall speed of convergence of the network upon change in topography may be increased. However, dividing the network into two or more network areas has a disadvantage, in that the establishment of connectivity that spans between the network areas needs to be accommodated.

Once the network passes a certain size, sub-division may not be sufficient in and of itself to solve scalability issues, and it may be necessary to reduce the amount of state in the core of the network (L2 network) in order to continue to grow the network. This can be achieved by hierarchically recursing the network (MACinMACinMAC) both at the control plane and data planes and, in the preferred embodiment, re-using MAC learning as per 802.1 ah in order to establish the bindings between the B-MAC layer and the further recursed MAC layer.

A loop in the forwarding path for Ethernet can be catastrophic, particularly if the forwarding path is a multicast path as it may lead to unbounded packet duplication. Therefore it is advantageous to constrain the interconnectivity of areas to be hierarchical vs. permitting a mesh interconnect of areas as the problem of ensuring loop freeness is simplified. Routing systems have such a concept, an exemplar being the notion of Level 1/Level 2 (L1/L2) in IS-IS, in which L1 areas are only connected to the one L2 area.

Figure 2:
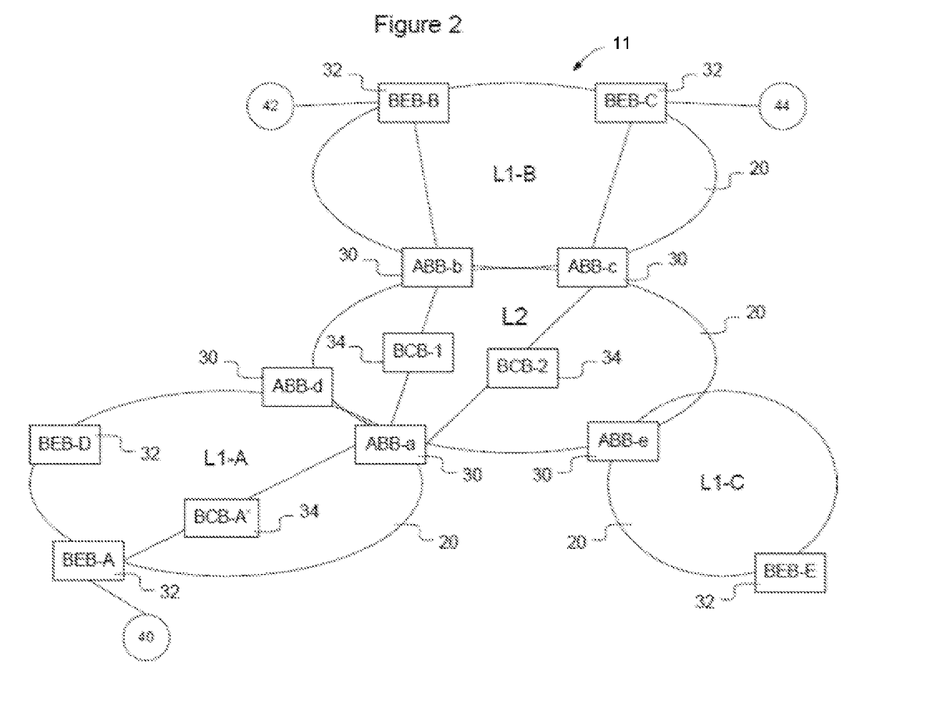
FIGS. 2 and 3 are functional block diagrams of an example set of interconnected link state protocol controlled Ethernet network areas according to an embodiment of the invention.

FIG. 2 illustrates one example of a communication network 11 in which multiple link state protocol controlled Ethernet network areas 20 are interconnected via Area Boundary Bridges (ABB) 30. Specifically, in FIG. 2, the network 11 includes a first set of link state protocol controlled Ethernet network areas L1A, L1B, and L1C. The first set of link state protocol controlled Ethernet networks may be, for example, metropolitan area networks, although the invention is not limited to this particular example. The networks L1A, L1B, and L1C are interconnected by another link state protocol controlled Ethernet network L2. The L2 network area may be, for example, a provider core network configured to interconnect the L1 networks. The invention is not limited to the particular example shown in FIG. 2, as the network of FIG. 2 is merely intended to illustrate one example environment in which the invention may be implemented. In IS-IS, the formal interface between an L1 and L2 is defined as being on a connection, not within a node. In this document an ABB is defined as a bridge having interfaces to at least one L1 link and at least one L2 link.

Customers connect to the networks via Backbone Edge Bridges (BEBs) 32. Within the network, connectivity is established via Backbone Core Bridges (BCBs) 34. Assume, as shown in FIG. 2, that a customer 40 that connects to network L1A via BEB-A would like to be able to communicate with customer 42 that connects to network L1-B via BEB-B, and would like to be able to communicate with customer 44 that connects to network L1-B via BEB-C. To enable communication of this nature, it will be necessary to establish a route between A and B via network areas L1-A, L2, and L1-B, and similarly to establish a route between A and C via network areas L1-A, L2, and L1-B.

In accordance with one embodiment of the present invention, the communication network 10 includes a single L2 area. Although an ABB may serve multiple disjoint L1 areas, each port on the ABB is dedicated to only one area. However, if there is a direct physical link between two ABBs serving the same area and it is desired to use the link for both L1 and L2 traffic, two logical ports are used in conjunction with a multiplexing scheme. Each L1 area is a stub area, i.e. there does not exist any ABB between two L1 areas that is not also connected to an L2 area. In order to facilitate the computation of loop free paths L1 intra-area traffic should not use L2 links. L2 nodes do not use L1 links as a transit to other L2 nodes, even if the L2 area would partition otherwise; however, an L2 node could use a Provider Backbone Transit (PBT) path through an L1 area: in that case the L2 traffic traverses the L1 area with an extra layer of Ethernet Encapsulation and an outermost VID different from that of the L1 traffic. With incoming traffic from different areas always arriving on distinct physical or logical port an ABB can easily maintain and use distinct Forwarding Information Bases (FIBs), one for each area served. Thus when a packet arrives on an L2 port the ABB consults the L2 FIB to determine how it should be forwarded.

There are a number of constraints to be considered in a multi-area solution. Unlike (for example) phone numbers, Ethernet MAC addresses cannot be summarized whereby a shorthand represents a group (such as 613 area code is the area code designating all phone numbers in Ottawa, Canada). Further the network areas should implement symmetrical forwarding such that traffic is able to follow the same path in both directions through the network.

In the example of FIG. 2, areas L1-A, L2, and L1-B are all link state protocol controlled Ethernet network areas, each of which is implementing its own link state routing protocol instance. Thus, routing information is generally contained within the various network areas, and only a limited or summarized amount of routing information is exchanged between areas. However, as described in greater detail herein, ABBs may allow community of interest identifiers such as I-SIDs and some associated BEB information to be leaked between areas, so routes associated with the BEBs with I-SIDs in common may be established through more than one area. Specifically, since interest in the I-SID may be leaked across the network boundary, route segments may be established for the I-SID in each of the network areas that collectively form a multi-area route Since leaking of the I-SIDs may be done without intervention by the network management system, the inter-area routes may be established automatically by the control planes of the multiple network areas.

According to an embodiment of the invention, ABBs on the border between two networks advertise with each network area as being able to reach the other network. Thus, for example in FIG. 2, ABB-a and ABB-d each sit on the boundary between network area L1-A and L2. Accordingly, each of these ABBs would advertise the ability to reach network area L2 within network area L1-A, and would advertise the ability to reach network area L1-A within network area L2. According to one embodiment of the invention, the ABBs may advertise network area L2 as a "pseudo node" (also known as a virtual BEB) in network area L1, so that the BCBs may automatically determine which ABB should handle traffic for a given set of closest BEBs by installing forwarding state for shortest paths between the closest BEBs and the virtual BEB advertised by the ABBs. In this manner the L1 network may self-select ABBs to represent sets of BEBs into the adjacent L2 network area. If all ABBs advertise the network area L2 as the same virtual BEB, then shortest paths from the BEBs in network area L1 will automatically be installed via the ABB that is closest to the virtual BEB, and hence from the set of BEBs that are closest to a particular ABB.

The ABBs serving a specific L1 self-select to represent particular BEBs into L2 by each ABB determining which BEBs in the L1 are closer to it than any other ABB. Thus, for example in FIG. 2, ABB-a is closest to BEB-A. Thus, routes from A that are required to pass out of network area L1-A will be installed via the Backbone Core Bridges (BCBs), such as BCB-A', to pass through ABB-a. Similarly, routes from BEB-D will be installed via ABB-d. There are many ways to do this, but the simplest (and the one requiring no special rules in the BEBs and BCBs in L1) is that L2 is represented into L1 by the ABBs as a single pseudo node, i.e. virtual BEB, connected to the ABBs with equal cost links. As mentioned above, L1 inter-area traffic should not use L2 links: the cost of the "links" to the pseudo node representing L2, needs to be great enough that the shortest distance path between any pair of nodes in the L1 area does not include the virtual BEB. In one embodiment of the invention this is ensured by setting the cost metric, the distance, for the "links" to be greater than half the diameter of the L1 area. The diameter of the L1 area is the greatest distance between any two node in the L1 area.

There are specific rules for how ABBs leak information between areas. An ABB closest to a BEB in L1 will advertise the I-SIDs and BEB MAC addresses associated with that area into L2, this is without apriori knowledge of what I-SIDs are of multi-area interest. ABBs will only leak BEB and I-SID information collected from other L1 areas from L2 into L1 where one or more BEBs in L1 have already indicated interest in the I-SID. Therefore the nodes in L2 will have a complete map of I-SIDs and BEBs in the control plane. The nodes in L1 will have a map of only those BEBs and I-SIDs of local area interest and those that are genuinely multi area.

One can see from the above that in L2, the appropriate dataplane connectivity will be built per community of interest identifier, i.e. per I-SID, between the ABBs electing to represent the associated BEBs in L1. Similarly in L1, the ABBs representing BEBs in other L1s will have the appropriate connectivity built to include the local BEBs that are part of the same community of interest as identified by the community of interest identifier.

BEBs on the L1 network area will advertise interest in a community of interest identifier, such as an I-SIDs, via link state advertisements or using other messages in the L1 network area. In this example, it will be assumed that the community of interest identifier is an I-SID. Other community of interest identifiers may be used as well.

The ABBs receive the messages indicating that one or more BEB on the L1 network area is interested in an I-SID. The ABB will leak I-SIDs learned on the L1 network area that have been advertised by those BEBs that are closest to it, into the L2 network area. By only advertising I-SIDs advertised by the set of BEBs that are closest to it, the L2 network may learn which ABB should be used to forward traffic on the route to the BEB. The ABB will also listen for I-SIDs advertised by other ABBs on the L2 network area. Where more than one ABB respectively attached to a different L1 on the L2 network area has advertised interest in the same I-SID, the I-SID is of multi-area interest. The detection of an I-SID in more than one L1 ensures that the L2 network doesn't install forwarding state between two ABBs on the same L1 network. If a single L1 has more than one ABB, the internal topology of that L1 may cause more than one ABB to advertise the I-SID into L2, but this must be ignored in L2 unless a different L1 also advertises that I-SID. In this instance, ABBs that have advertised the I-SID in the L2 network will also advertise the I-SID back into its attached L1 network area, so that connectivity in the L1 network area may be established from the BEB to the ABB in the L1 network area. If multiple ABBs advertise an I-SID back into L1, connectivity between the ABBs themselves for that I-SID is not established in L1. In the example of FIG. 2, connectivity between ABB-b and ABB-c is not established in L1-B.

In the Example shown in FIG. 2, it will be assumed that BEB-A has advertised an interest in I-SID-x in network area L1-A, and that BEB-B and BEB-C have advertised an interest in I-SID-x in network area L1-B. ABB-a, ABB-b, ABB-c will all advertise interest in all I-SIDs into L2 that are advertised by BEBs which they represent. Thus, in this example, ABB-a will advertise MAC-BEB-A/I-SID-x, ABB-b will advertise MAC-BEB-B/I-SID-x, and ABB-C will advertise MAC-BEB-C/I-SID-x. ABB-a, ABB-b, and ABB-c will all determine that I-SID-x is of multi-area interest, by receiving the advertisements from the other ABBs on L2, and determining that the I-SID-x is being advertised from both L1-A and L1-B. Accordingly, ABB-a will advertise MAC-BEB-B/I-SID-x, and MAC-BEB-C/I-SID-x into network area L1-A, and ABB-b and ABB-c will advertise MAC-BEB-A/I-SID-x into network area L1-B. As explained below, these advertisements into L1 areas are made to appear as if they originated from the L2 pseudo node advertised by ABBs into L1 areas. By causing each ABB to advertise all I-SIDs learned from its adjacent L1 network area into the L2 network area, the ABBs on the L2 may determine which I-SIDs are required to extend between L1 network areas and selectively advertise MAC/I-SID information for only those routes into their L1 network area.

An ABB will leak all I-SIDs of interest to their set of BEBs in L1 from L1 into L2, ABBs in L2 will advertise all the L1 I-SIDs between themselves BUT will only advertise I-SIDs from L2 into L1 when the same I-SID is also already being advertised by that L1. Thus, the net result is that within L1 all BEBs interested in a specific I-SID will have connectivity established by the routing system. Only if that I-SID exists in another area will the ABBs advertise interest in that I-SID into that L1 (in which case connectivity out of the area via the ABBs will be constructed). Within the L2 network area, the BCBs will install connectivity between ABBs of the different L1 areas that have advertised interest in the same I-SID, so that connectivity within the L2 network may be established. If any L1 has more than one ABB advertising an I-SID into L2, connectivity for that I-SID between those ABBs is not established in L2.

ABBs will advertise all I-SIDs and associated BEB information from L1 into L2. The I-SID information that is advertised from the L1 network area into the L2 network area will be in the form of the ABB MAC address, the I-SIDs and the BEB MAC addresses associated with the I-SID. When an ABB has received an I-SID advertisement from another ABB in L2 and has also received an advertisement from the local L1 indicating interest in the same I-SID, it will advertise the I-SID and BEB information received from L2 into L1.

The I-SID will be advertised within network L2. Similar to how single area solution works BCBs within area L2 will install forwarding state to enable shortest paths to be created between ABBs attached to different L1 areas that are advertising interest in the same I-SID. Thus, for example, assume that ABB-a, ABB-b, and ABB-c all advertise interest in I-SID=x. BCB-1 will recognize that it is on a shortest path between two ABBs that have advertised interest in a common I-SID and install forwarding state to enable frames to be forwarded from ABB-a to ABB-b and vice versa. Similarly, BCB-2 will install forwarding state to enable frames to be forwarded from ABB-a to ABB-c and vice versa.

ABB-b and ABB-c will leak the I-SID from network area L2 into network area L1-B as if it was advertised from a virtual BEB located behind ABBs b & c. BCBs within network L1-B will then install forwarding state if they are on shortest paths between a BEB that has advertised interest in an I-SID and the virtual BEB (which the ABB has advertised as also interested in the I-SID). ABBs make advertisements appear to come from a virtual BEB when there are two or more ABBs leaking an I-SID from network area L2 into a L1 area. In one embodiment, ABBs are configured to always make advertisements into a L1 area appear to be advertised by virtual BEB. In another embodiment, ABBs are only configured to use virtual BEBs for leaking I-SIDs into a specific L1 when there are a plurality of ABBs connected to that L1 area. There are other possible embodiments in which an ABB determines that it is the only one that needs to advertise the I-SID into the L1 area (such as ABB-a in FIG. 2), and so advertises the interest in the I-SID as coming from itself Note, in this regard, that by causing the ABBs to self-select which BEBs to represent in connection with routes that exit L1-B, parallel paths have been created between ABB-b and BEB-B, and ABB-c and BEB-C. However, using multiple ABBs to reach different BEBs will not cause forwarding conflicts as what is actually being created is a spanning tree to the virtual BEB that represents L2, which naturally results in routes between BEBs and ABBs being only installed from a BEB to the closest ABB. Where there are equal cost paths between a given BEB and two or more ABBs, the routing system will use a normal intra area tie breaking mechanism to determine which ABB should represent the BEB in the adjacent area.

I-SIDs are commonly associated with multicast connectivity. Specifically, a given multicast may be established on a network by causing those BEBs interested in the multicast to advertise interest in the I-SID associated with the multicast. Forwarding state will then be installed for the multicast as described in greater detail in U.S. patent application Ser. No. 11/702,263, as mentioned above. Other community of interest identifiers may be used instead of the I-SID and the invention is not limited to an implementation that uses the I-SID as the community of interest identifier. As mentioned previously, it is desirable to leak knowledge of BEBs between areas but in a mechanism that minimizes how changes in one area perturbs another. One way to do this is to simply associate the BEBs with the ABB in the peer area as if they were co-located, so that no knowledge of the topology of the peer area (in the form of actual metrics) need be shared between the areas. It has been simplified to simply associating a BEB with the closest ABB. One consequence of this is that the multicast tree for a given I-SID rooted at an ABB will be identical for all BEBs that are behind the ABB. This means that scalability can be enhanced by using a common destination multicast address for those multicast flows for a given I-SID that transit an ABB.

Since the ABBs may represent into L2 multiple multicasts rooted in the set of closest BEBs, it may summarize the multicasts when leaking routing information into the adjacent area L2. For example, ABB-a may summarize multicast routing information mMAC(BEB, I-SID) by advertising instead mMAC(ABB, I-SID). Specifically, the ABB may substitute its own DA for the DA of the BEB for the given I-SID. This may also be repeated at the boundary between L2 and L1. So to illustrate:

Going from L1 to L2 the multicast tree in L2 rooted at a given ABB is common to all BEBs in the L1 that were closest to that ABB.

Going from L2 to a specific L1, the multicast tree in that L1 rooted at a given ABB is common to all ABBs in L2 which root a tree for any other L1. Note that this tree will extend into the L1 only to the BEBs that are closest to the given ABB.

No ABB on a given area boundary is ever a leaf on a multicast tree rooted on another ABB on that area boundary, either in L1 or L2.

From a path construction standpoint in the L1-A network, BCB-A' will determine that it is on a shortest path from BEB-A to L2 (via ABB-a). BCB-A' also will determine that BEB-A and ABB-a have an I-SID in common. Thus, BCB-A' will generate and install a multicast group address for BEB-A/I-SID=x. It will also install unicast addresses for remote BEBs that have advertised an interest in I-SID-X (BEB-B and BEB-C in this example), will install a unicast address for local BEB-A, and will generate and install a multicast address for ABB-a/I-SID=x.

In the L2 network, BCB-1 will determine that it is on the shortest path between ABB-a and ABB-b in L2 and that both have an I-SID (I-SID=x) in common. BCB-1 will generate and install multicast addresses for ABB-a/I-SID=x and ABB-b/I-SID=x and install unicast addresses for BEB-A and BEB-B.

Within a given L1 network, such as network L1-B, multiple ABBs may advertise interest or knowledge of a given I-SID. To enable BCBs within the network (L1-B network) to install forwarding state, the ABBs will advertise the I-SID in connection with the virtual BEB representing the L2 network. This will allow the BCBs to only install forwarding state for routes that span between areas through the closest ABB to the interested BEB. This also prevents multiple paths from being installed between a given BEB and more than one ABB, since only one shortest path from the BEB to the virtual BEB representing the L2 network will be installed, which will automatically go through the closet ABB to that BEB. BCBs may be configured to not install forwarding state between ABBs on a common network boundary (e.g. L1A-L2) even though two or more ABBs may be advertising interest in the same I-SID.

Within L2, a given ABB may have many BEBs behind it that it is representing into the L2 network area. To simplify the shortest path calculation on BCBs within the L2 network area, the BCBs will base the routing computations on the ABBs rather than on the BEBs the ABBs represent. In this instance, each BCB in L2 may determine if it is on the shortest path between two ABBs, and if so whether the ABBs have an I-SID in common. If both of these conditions exist, the BCB may then install forwarding state for the multicast MAC address mMAC(ABB, I-SID=x) and the unicast MAC addresses uMAC(BEB) for those BEBs participating in the set of I-SIDs common to the two ABBs.

By causing the ABBs to self-select, unicast forwarding may be established across multiple domains without requiring explicit paths to be set up. Rather, the routing system may implement the unicast paths and enable forwarding state to be set up for the unicast paths even where the unicast paths are required to span across multiple network areas.

Since each network area has its own control plane, topology changes may often be isolated within a given network area. However, when a topology change occurs that changes in some way which ABBs are closest to which BEBs, the topology change will also affect the adjacent network. Specifically, assume that a failure has occurred on network L1-A which has caused the shortest path to L2 for BEB-A to change such that it transits ABB-d. In this instance the routing system in L1-A will cause a new shortest path to be established from BEB-A to ABB-d, and will cause ABB-d to advertise BEB-A/I-SID=x into L2. This will cause new shortest paths to be established within L2 between ABB-a and ABB-d, and between ABB-c and ABB-d. However, the network change will not affect the other L1 areas so that local failures are able to be contained without cascading routing changes throughout all areas of the network. Additionally, while some failures in network L1-A may affect the routing system in L2, many failures in network L1-A will not affect the selection of ABBs for the BEBs, thus enabling the failure to be localized within L1-A so that the routing within L2 is not affected by the failure.

Once consequence of L2 being modeled as a virtual BEB in L1 is that multiple copies of a multicast packet may enter L1 from L2. However as the overall behavior is that of a spanning tree rooted at the virtual BEB in L2, each BEB in L1 will still only receive one and only one copy of a given multicast packet.

Although an example has been provided, and described in detail in connection with a particular example network shown in FIG. 2, the invention is not limited in this manner as the techniques described herein may be used in many different network settings to construct paths across multiple areas. Thus, the invention is not limited to an implementation in a network having network areas interconnected as shown in FIG. 2 but rather may be employed in connection with any network in which two or more link state protocol controlled Ethernet network areas are interconnected by one or more ABBs. Similarly, although the I-SID was used as an example of a type of community of interest identifier that may be used to determine which communities of interest span between areas, the invention is not limited in this manner as other community of interest identifiers may be used as well.

Where a given BEB has two or more paths that are equal cost to two or more ABBs and diverge, then it may be necessary to use different VIDs to differentiate the traffic to the different ABBs. Other ways of resolving conflicts between ABBs may be used as well and the invention is not limited to an implementation that uses different VIDs to identify traffic intended to the different ABBs.

ABBs and BCBs in L2 have an additional requirement in that an ABB on a given area boundary cannot be a leaf for a multicast tree from an ABB on the same area boundary. This prevents loops from forming at area boundaries.

When traffic is forwarded from one network area into another network area, such as a L1 area into the L2 area, the traffic may be encapsulated so that forwarding over the second area occurs using that area's MAC addressing space. For example, when a frame is received by BEB-A from customer 16 that is addressed to customer 18 on BEB-B, the frame will initially have the destination address DA=C-MAC address of customer 18. BEB-A will determine which BEB is able to reach the customer MAC address and encapsulate the customer frame using a provider Ethernet header. For example, BEB-A may perform MAC-in-MAC encapsulation so that the frame may be forwarded over the L1-A network using provider MAC address space rather than customer MAC address space. There are several ways for the BEB-A to determine which BEB on the network is able to reach customer 18 and the invention is not limited to the particular way in which this information is disseminated.

After the frame is transmitted across network area L1-A, it will arrive at ABB-a where it will be transmitted onto network area L2. It will be assumed, in connection with this, that the paths have been established as described in greater detail above. According to an embodiment of the invention, ABB-a may further encapsulate the frame for transmission across the L2 network by performing MAC-in-MAC-in-MAC encapsulation so that forwarding of the frame within the L2 network may use L2 MAC address space. Specifically, ABB-a may determine which other ABB on L2 is able to forward the frame on to its destination (B-MAC address) will determine the MAC address of the destination ABB on the L2 network (A-MAC address) and will then add a L2 MAC header to further encapsulate the frame for transmission on the L2 network. This enables L1 addresses to be summarized onto L2 at the ABBs via encapsulation, so that BCBs within L2 need only install routes based on L2 MAC (A-MAC) address space.

C-MAC/B-MAC learning in the L1 network space may be populated in a normal manner. Similarly, L1-MAC/L2-MAC (B-MAC address→A-MAC address) learning may be populated by the normal learning process, such as by flooding a request for a L1-MAC/L2-MAC association and waiting for a response, or by using a distributed hash table.

Figure 3:
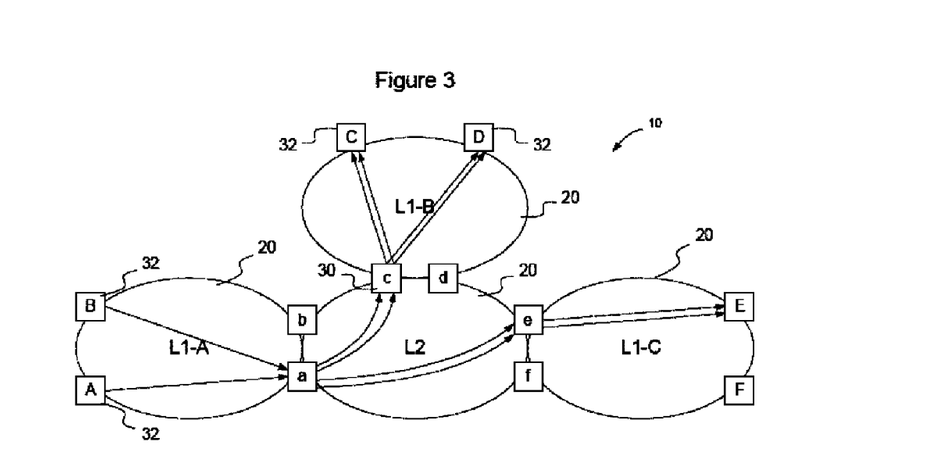

FIG. 3 illustrates visually what is happening in connection with the encapsulation process. Specifically, the L1-A metrics remain local to network area L1-A. L2 simply filters inter-L1 area routes by I-SID. This enables uMAC/mMAC congruence in L1, L2, and MAC-in-MAC-in-MAC. Multicast MAC addresses from L1-A are mapped via I-SID to a tree in L2. ABB-a needs to know that the path to BEB-E is via ABB-e. This association may be learned by flooding a request and waiting for a response. Flooding on network areas is capped at ABB boundary nodes, however, so that B-MAC/A-MAC association requests are not flooded into other areas of the network. Once the B-MAC/A-MAC association is learned by the ingress ABB, the ABB may use that address to encapsulate frames for transmission on the L2 network. Optionally, a self-assigned L2 multicast MAC address may be used where a given I-SID has been advertised by more than one destination ABB on the L2 network.

Figure 4:
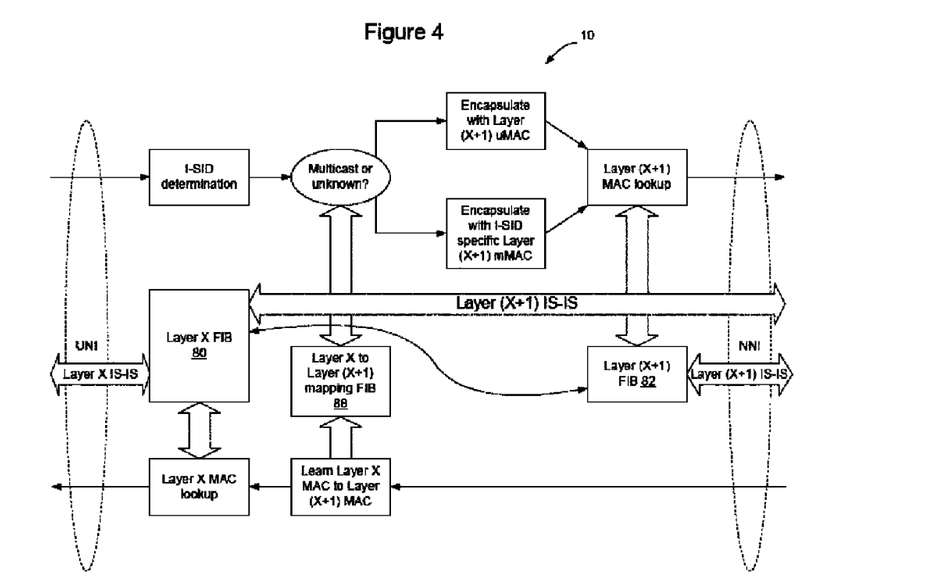
FIG. 4 is a functional block diagram decomposition of an ABB that implements both partitioning of the network into areas and hierarchical routing and which shows a process used to enable community of interest identifier information to be leaked between network areas so that paths may traverse between link state protocol controlled Ethernet network areas according to an embodiment of the invention.
Figure 6:
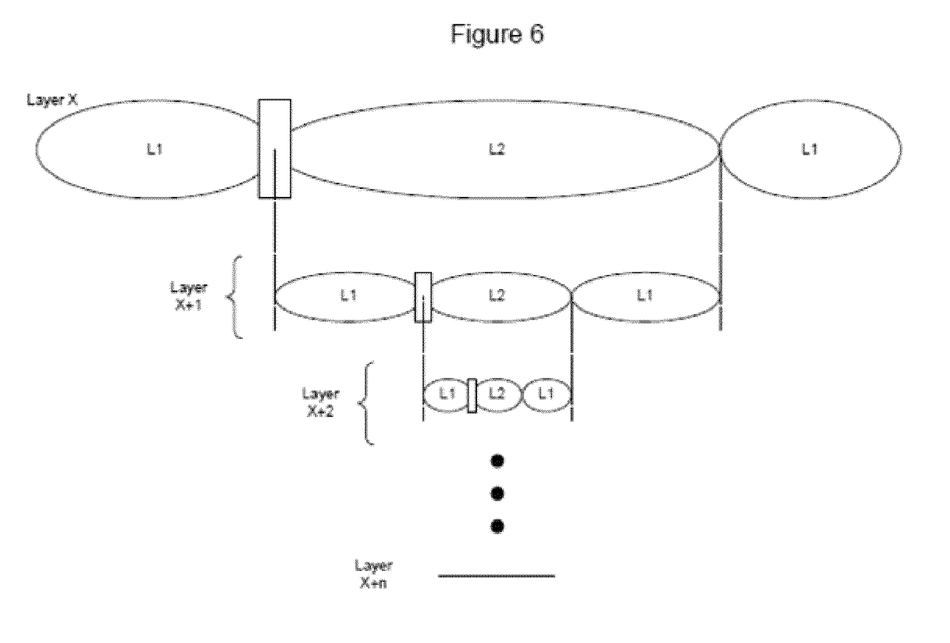
FIG. 6 is a functional block diagram of a network configured to employ recursion to enable subdivision of the network according to an embodiment of the invention.

FIG. 4 illustrates the adaptation and interlayer learning and binding functions between layers when the routing system recurses. As mentioned above, the L2 network may become too large and it may be desirable to further recurse the network to allow the L2 network to be broken up into a second level L1/L2/L1 network as shown in FIG. 6. FIG. 4 shows a process of enabling a frame to be encapsulated for transmission over a recursed L2 from L1 (where the unencapsulated layer is termed "layer X" and the encapsulated layer is referred to as "layer x+1"), and also illustrates a process of enabling a frame to be deencapsulated after receipt from the recursed network area L2 for transmission over network area L1 in a given layer.

FIG. 4 is a functional block diagram decomposition of an ABB that implements both partitioning of the network into areas and hierarchical routing. As such it communicates with peers in each partition L1 and L2 of the current layer respectively. It also peers at the recursed level, layer X+1.

The L1 FIB for layer X is populated via routing exchange with peer devices at L1 (including those communicated with across L2), similarly the L1 FIB for layer X+1 (the encapsulating layer) is populated via routing exchange with peer devices at layer X+1.

As shown in FIG. 4, when a frame is received from L1 at layer X, the ABB will look to see if the layer X destination MAC cannot be resolved to an layer X+1 MAC via lookup in the X to X+1 mapping FIB or if the frame is a broadcast or multicast frame. In these cases it will be encapsulated using the layer X+1 MAC of the BEB as the source and the multicast MAC address for the I-SID used by the BEB in layer X+1 as the destination, and forwarded according to the layer X+1 FIB. If the layer X destination MAC address can be resolved to a layer X+1 MAC address the packet is encapsulated with the BEB MAC address as the source and the layer X+1 MAC address obtained from the X to X+1 mapping FIB as the destination and forwarded according to the layer X+1 FIB.

When a packet is received from layer X+1, the source MAC is associated with the layer X source MAC and the binding inserted into the X to X+1 mapping FIB. The packet is deencapsulated and forwarded according to the information in the "layer X" FIB. It is the learning of X to X+1 bindings via creative reuse of the 802.1ah MAC learning process that obviates the need to explicitly communicate interlayer bindings in the layer X+1 routing system.

It can be noted that the network can actually use this technique to recurse an arbitrary number of times. It can also be noted that what is referred to in the example can also be sub-divided without recursion, such that a mixture of recursion, and subdivision at each layer of recursion can be employed to scale the network. This is illustrated in FIG. 6. For example, as shown in FIG. 6, the L2 network may be formed as a Layer X+1 L1/L2/L1 network having multiple L1(X+1) networks interconnected by a L2(X+1) network area. Similarly, the L2(X+1) network area may be formed as a L1/L2/L1 set of(X+2) network areas. The process described in connection with FIG. 4 may be used to implement the boundary between the L1(X) and L1/L2/L1 (X+1) layer, the boundary between the L1(X+1) and L1/L2/L1 (X+2) layer, or any further boundary between a network area and a further recursed L1/L2/L1 (X+n) layer.

From a routing standpoint, the UNI interface on the layer X network side of the ABB will store layer X I-SID information received via the layer X network link state routing protocol in the layer X FIB. Similarly, the NNI interface on the layer (X+1) network side of the ABB will store layer X+1 I-SID information received via the layer X+1 network link state routing protocol in the layer X+1 FIB. However, according to an embodiment of the invention, I-SID information is leaked between the layer X and layer X+1 networks to enable the layer X+1 network to selectively install routes through the layer X+1 network for I-SIDs that are common to different areas of the layer X network.

From a control plane perspective, the control plane information is summarized/aggregated across the layer X+1 network, to reduce the amount of information that must be handled on the control plane and installed in layer X+1 forwarding tables. This is advantageous from a scaling perspective, since the BCBs on the layer X+1 network are only require to store forwarding information for Layer X+1 MAC addresses.

The both layer X exchange and layer X+1 exchange communicates I-SID membership of peer devices, which enables other ABBs to know which I-SIDs should be leaked. The I-SID information is then used to construct multicast connectivity in the layer X+1 network area and to learn interlayer bindings. Where the layer X network uses Mac-in-Mac encapsulation, and the layer X+1 network uses Mac-in-Mac-in-Mac encapsulation, the I-SID information is used to enable the ABB to learn the Mac-in-Mac/Mac-in-Mac-in-Mac bindings so that the ABBs are able to encapsulate traffic on a per-I-SID basis.

Where alternate ABBs are to be used to interconnect the L1/L2 networks, the alternate ABB may be provided with a large metric so that it is not likely to be chosen as providing the shortest path for any BEB on the L1 network area. However, the alternate ABB may still leak I-SID information into the L1 network area, and vice-versa, to enable the network elements to have information about the ABB to enable faster convergence in the event of a failure on the primary ABB.

When an ABB fails, all traffic for an I-SID needs to be reconstructed. The traffic for the I-SID will need to be associated with a different ABB, which will require BCBs within the L1 network to install new forwarding state. One way in which this may be accomplished is to cause the new forwarding state to be installed using a different VID so that two sets of connectivity may be installed—a first set of paths for the primary ABB and a second set of paths for the secondary ABB. The forwarding state may be installed upon determination of a failure or, alternatively, may be pre-computed and installed before the failure occurs. Installing the backup forwarding state using a different VID enables the different forwarding state to be installed on the network ahead-of-time so that, upon failure of an ABB, the traffic may be automatically switched over to the alternate paths by causing the traffic to be tagged using the alternate VID.

Figure 5:
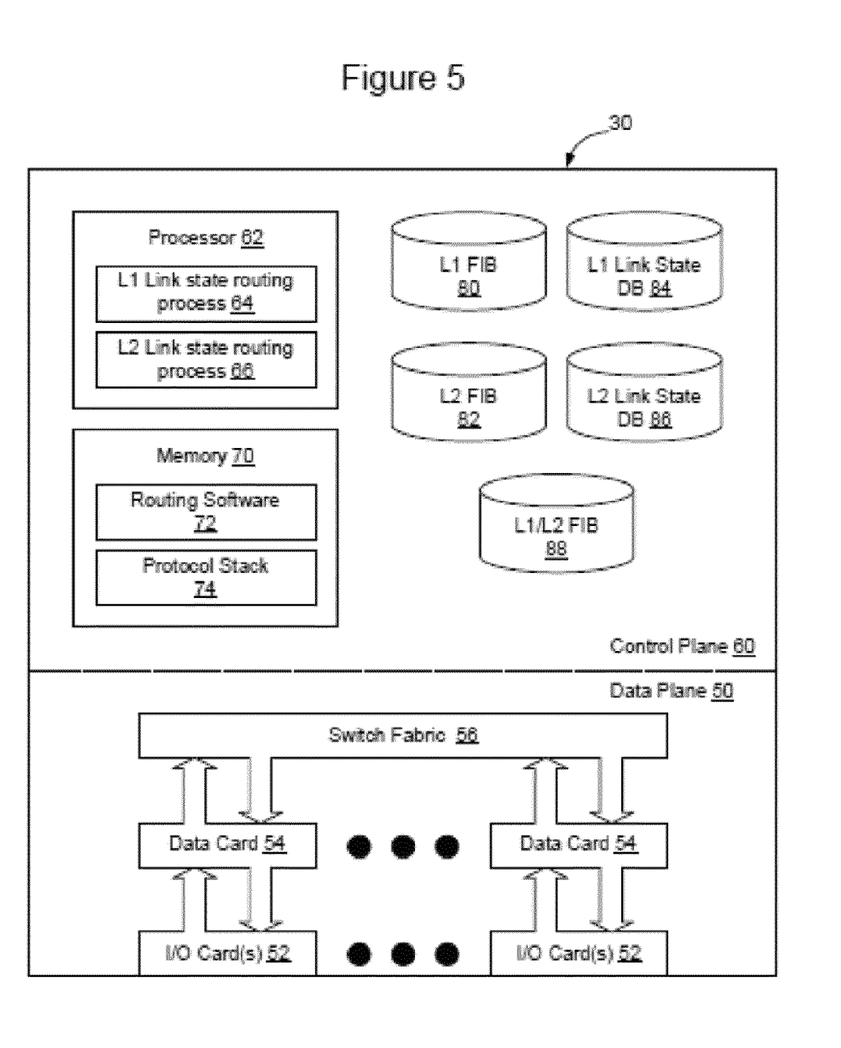
FIG. 5 is a functional block diagram of network element that may be used as an Area Boundary Bridge (ABB) at a boundary between two link state protocol controlled Ethernet network areas according to an embodiment of the invention.

FIG. 5 illustrates an example of a network element that may be used to implement an embodiment of the invention. As shown in FIG. 5, the network element includes a data plane 50 and a control plane 60. The data plane 50 generally includes Input/Output cards configured to interface with links on the network, data cards 54 configured to perform functions on data received over the I/O cards 52, and a switch fabric 56 configured to switch data between the data cards/I/O cards. The control plane contains a processor 62 containing control logic configured to implement a L1 link state routing process 64 and a L2 link state routing process 66. Other processes may be implemented in the control logic as well.

Data and instructions associated with the L1 link state routing process 64 and a L2 link state routing process 66 may be stored as L1 routing software 72 and L2 routing software 74 in memory 70. One or more databases or tables may be maintained by the ABB 30 as well to enable the ABB to store information associated with the routes that have been installed on the L1 and L2 networks. For example, the ABB 30 may include a L1 FIB 80, a L2 FIB 82, a L1 link state database 84, a L2 link state database 86, and a L1/L2 FIB 88 containing community of interest identifier (e.g., I-SID) associations between the forwarding information in the two networks. The ABB may contain other software, processes, and stores of information to enable it to perform the functions described above and to perform other functions commonly implemented in a network element on a communication network.

The functions described above may be implemented as a set of program instructions that are stored in a computer readable memory and executed on one or more processors on a computer platform associated with a network element. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It is possible to envision variations of U.S. patent application Ser. No. 11/537,775, filed Oct. 2, 2006, entitled "Provider Link State Bridging," with respect to how both the source and multicast group of interest are encoded in the dataplane which can be accommodated by the basic techniques for shortest path tree construction described above, but with small modifications to the dataplane transfer function performed at ABBs.

In one variation, the multicast group address for a given group of interest is common to the entire group of BEBs that support the group of interest and the specific source BEB or ABB (multicast source) is encoded in the VLAN field. In this case, summarization of multicast MAC addresses is not possible, but summarization of VLAN information is possible between areas. This is useful as such a technique is not frugal of VLANs and therefore a multi-area solution can dramatically increase the scalability of the network. Summarization can be performed by well understood VLAN translation at the ABB egress, whereby the ABB overwrites the VLAN of a multicast packet with a VLAN value that has been assigned to the ABB as a multicast source. The invention is not limited by the particular way in which VLAN values are assigned to the ABBs as multicast sources.

In this variation, the shortest path tree from a given BEB would have a unique VLAN wrapper per tree, so the shortest path tree from BEB A would see (for example) all packets from BEB A tagged with VLAN 1, all packets from BEB B tagged with VLAN 2 etc. Reverse path forwarding check (RFPC) would then be performed on the VLAN instead of the source MAC address. Packets that are required to transit between areas would flow through an ABB and onto a shortest path tree in an adjacent area. Packets flowing on the shortest path tree from an ABB would simply be re-tagged with the VID assigned to the ABB as a multicast source, so that the ABB becomes the "choke point" for the set of multicast sources that transit areas via that ABB. Thus, given that there are 4000 odd VLAN tags available, the net result is that each "area" or "level" could have 4000 nodes (sum of BEBs, BCBs, and ABBs), while summarization by the ABB (and replacement of the VID by the ABB) thus permits each area to have its own VID space and the network can grow in size by multiples of 4000 nodes per area.

In another variation, the multicast group address is common as described above, but the source is only encoded in the source MAC address, and the VLAN used is common to all BEBs. In this case, no summarization of multicast addressing is possible at an ABB and the packets would be passed unmodified.

Figure 7:
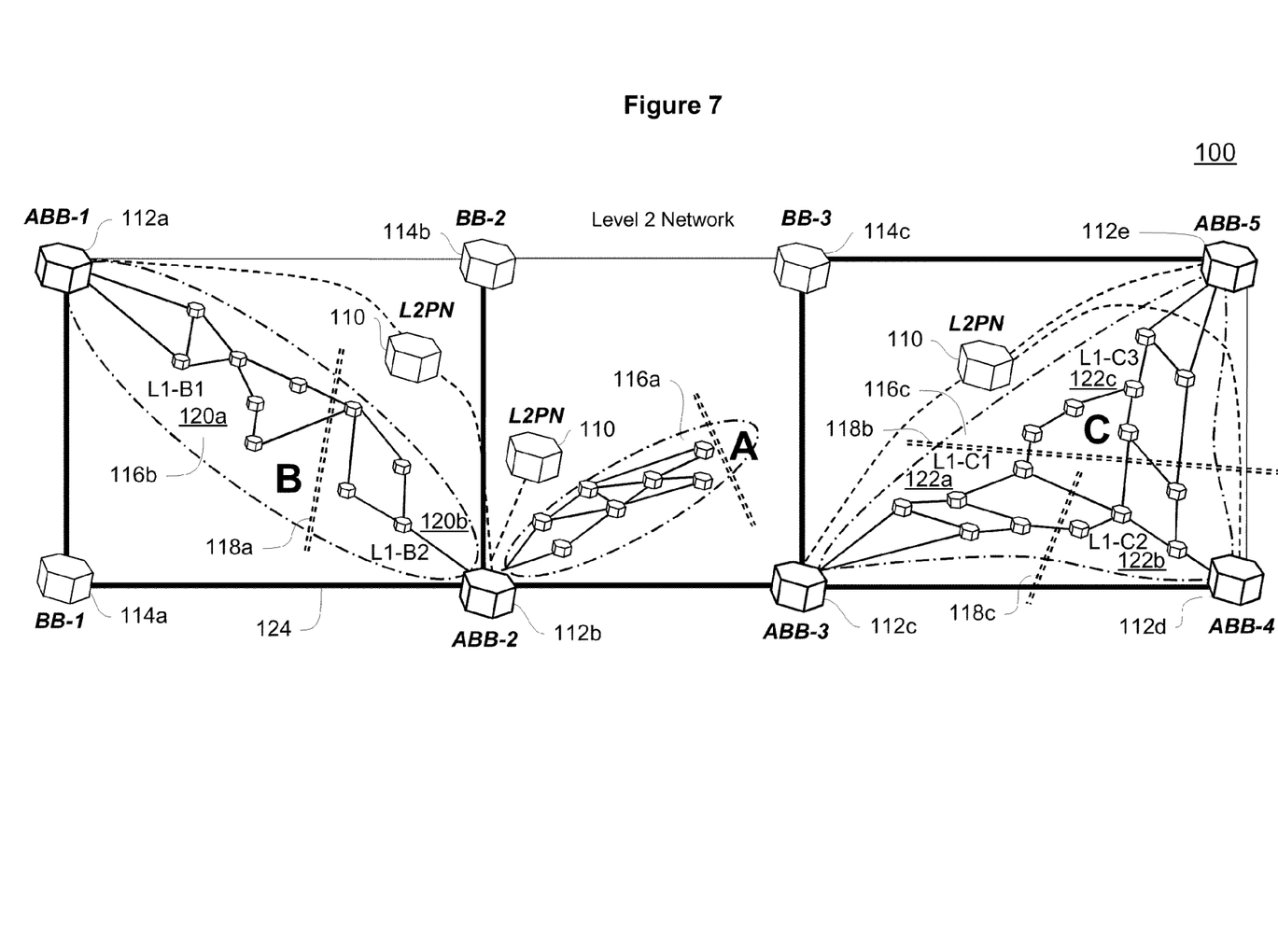
FIG. 7 is a functional block diagram of a two level provider link state bridging ("PLSB") network having ABBs with multi-homes constructed in accordance with the principles of the present invention.

Referring now to FIG. 7, an exemplary PLSB communication network 100 is illustrated wherein an ABB may be "homed" in multiple L1 areas. In other words, an ABB may serve multiple disjoint L1 areas. The PLSB communication network 100 is depicted with an L2 area 110 that extends geographically to encompass several L1 areas 116 as would be the case when L1 areas are metropolitan networks and the L2 area is a national backbone network. The single L2 area 110 includes five ABBs, i.e. ABB-1 112a, ABB-2 112b, ABB-3 112c, ABB-4 112d and ABB-5 112e, (referenced collectively as ABB 112), and three other BBs, i.e. BB-1 114a, BB-2 114b and BB-3 114c (referenced collectively as BB 114). PLSB communication network 100 also includes three L1 stub areas, i.e. L1-A 116a, L1-B 116b, and L1-C 116c (referenced collectively as L1 area 116). L1-A 116a is served by a single ABB, namely ABB-2 112b. L1-B 116b is served by two ABBs, namely ABB-1 112a and ABB-2 112b. L1-C 116c is served by three ABBs, namely ABB-3 112c, ABB-4 112d and ABB-5 112e. Note that the L2 area 110 is represented in FIG. 7 as a pseudo node L2 PN in each of the L1 areas 116.

When an L1 area 116 is served by more than one ABB 112, the nodes in that L1 area 116 are partitioned into disjoint "subsets" of nodes, one per ABB, where all the nodes of a partition are "closer" to the specific ABB than to the other ABBs in the L1 area. As is usual in the field of routing protocols, "closer" in this specification means that the sum of link metrics for the shortest path between the node and the specific ABB is less than or equal to that for the shortest path to any other ABB and, where there is a tie, that is the sum of link metrics is the same between the node and two or more ABBs then a tie breaking mechanism determines that the specific ABB is "closer". In communication system 100, as L1-B 116b is served by two ABBs, it is partitioned into two subsets, illustrated by dividing cut line 118a. Subset L1-B1 120a is served by ABB-1 112a and subset L1-B2 120b is served by ABB-2 112b. Likewise, as L1-C 116c is served by three ABBs, it is partitioned into three subsets, illustrated by dividing cut lines 118b and 118c. Subset L1-C1 122a is served by ABB-3 112c, subset L1-C2 122b is served by ABB-4 112d and subset L1-C3 122c is served by ABB-5 112e.

It should be noted that ABB-2 112b serves two disjoint L1 areas, namely L1-A 116a and L1-B 116b. Normally, when an ABB 112 serves a single L1 area 116, the ABB 112 references a single L1 FIB for forwarding data packets as described above. However, for ABBs serving multiple L1 areas, there should be multiple L1 FIBs, one L1 FIB for packets arriving on all the ports.

A link to pseudo node L2 PN 110 representing the L2 area is advertised by each ABB 112 into their L1 area(s) 116. The cost metric associated with the advertisement is normally identical for all ABBs. However, in this case, the metric is greater than half the maximal diameter of the L1 area 116 so that the L2 PN 110 does not appear on any intra-area shortest paths. This large metric effectively partitions the L1 area 116 into disjoint subsets of nodes that are "closest" to each ABB 112. "Port MACs" and ISIDs for the total set of "external" MACs are also advertised with the L2 PN. For each subtending L1 area subset, each ABB 112 advertises into Level 2 the "port MACs" and ISIDs for the subset. A distinct root-id for the subset is included in the link state packet for the subset. It can be seen that the L2 PN 110 is the root node for the overall tree, hence the use of its nickname as the root-id for any multicast traffic entering the L1 Area.

The L2 Pseudo Node 110 performs a number of functions including the following three. First, using the large metric ensures that intra L1 area traffic does not transit Level 2. Second, calculation of a "closest" subset of L1 nodes for an ABB is simplified to nodes on the shortest path to the L2PN. Finally, all the external port MACs are associated with a single node.

For unicast messages, traffic arriving on L2 ports is forwarded according to the L2 FIB, and traffic on L1 ports is forwarded according to L1 FIB. These FIBs differ in the case where the destination is in the L1 area but is not in the ABB's "closest" subset. In this case, the L1 FIB dictates forwarding the packet on another L1 port, while the L2 FIB has the packet forwarded over a L2 port toward another ABB.

The L2 multicast tree with source ABB-2 112b is depicted in FIG. 7 as thick, solid lines 124. For multicast packets, the "closest" subsets in L1 116 are needed to ensure single copy packet reception for those packets arriving on L2 ports at multiple ABBs of the same L1. In the example L2 multicast tree shown, a multicast packet originated through ABB-2 112b will be replicated to three ABBs serving L1 area C 116c: namely ABB-3 112c, ABB-4 112d and ABB-5 112e. A tree rooted at the ABB 112 is not confined to the "closest" subset so the root-id for the tree that covers just the "closest" subset cannot be the nickname of the ABB. However, the root-id can be the L2PN nickname. Advertising the L2 PN as described above naturally produces the "closest" subset and the multicast forwarding trees. It should be noted that "closest" subset for each B-VID do not necessarily include the same node set, i.e. Equal-cost multi-path routing (ECMP) paths to L2PN 110 may use different ABBs 112.

Thus, in one embodiment of the present invention, when a multi-cast packet arrives at an ABB 112 on a Level 2 port, the incoming packet's root-id is examined. If the root-id is that of another "closest" subset of the same L1 area, then the packet is dropped. Otherwise, the root-id is replaced with the L2PN root-id and forwarded over the L1 tree covering that ABB's "closest" subset.

To provide symmetry, a multicast from an L1 node exits to L2 110 only at the ABB 112 serving its "closest" subset. This means that the L2 multicast tree must be isomorphic to the L2 multicast tree rooted at the ABB 112. However, the root-id cannot have the nickname of the ABB in order to avoid having multicast traffic re-entering the L1 area 116 from another ABB 122. Thus, referring once again to the exemplary communication network 100 of FIG. 7, ABB-1 112a should replicate packets from ABB-2 112b into L1-B 116b if they came from L1-A 116a, but not if they came from L1-B 116b.

The root-id in L2 for all the trees routed in ABBs 112 serving the same L1 area 116 should not be the same because the trees from each ABB are not disjoint. The root-id should be distinct and easily tested for area identity so that an ABB 112 can discard, rather than forward, packets that originated from its own area. Thus, for a multicast packet from Level 1, if the packet's root-id belongs to the ABB's "closest" subset then the root-id is swapped to a unique "closest" subset root-id and forwarded on all Level 2 ports that are part of the "closest" subset multicast tree for the packet's ISID.

A typical combination of hardware and software could be a specialized computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for ensuring that multicast packets follow a same loop-free path as a path followed by unicast packets in a packet communication network, the packet communication network including at least one first area defined by a first level, each first area including a first plurality of nodes interconnected by a first set of links, each first area interconnected through at least one area border node to a second area defined by a second level, the second area including a second plurality of nodes interconnected by a second set of links, each area border node having at least one first level port connected to the at least one first area and a second level port connected to the second area, each multicast packet forwarded over the loop-free path including a header having a root-id identifying a root of a multicast tree, the method comprising:

receiving at least one data packet at an area border node; and responsive to receiving a multicast packet at a second level port of an area border node:

examining the root-id of the multicast packet;

determining whether the multicast packet is to be forwarded on at least one of the first level ports of the area border node; and responsive to determining that the multicast packet is to be forwarded over at least one of the first level ports, substituting a different root-id into the packet before forwarding the packet over the at least one first level port.

2. The method of claim 1, wherein the packet communication network is an Ethernet network, the different root-id being associated with a pseudo node representing the second area.

3. The method of claim 1, wherein at least one first area is serviced by more than one area border node, the method further comprises dividing the at least one first area into a group of subsets, the group of subsets including an amount of subsets equal to an amount of area border nodes servicing the first area, each subset associated with a respective area border node.

4. The method of claim 3, wherein each subset includes nodes having a shortest path to the associated area border node.

5. The method of claim 3, wherein dividing the at least one first area into a group of subsets comprises:

each area border node originating an advertisement for a link to a pseudo node representing the second area, the advertisement including an associated metric greater than half a maximal logical diameter of the associated first areas; and transmitting the advertisement into its associated first areas.

6. The method of claim 5, further comprising assigning a unique identifier to each subset.

7. The method of claim 6, wherein a unique identifier for a subset is included in the advertisement as a root-id.

8. The method of claim 7, wherein the at least one received data packet is a multicast packet received on a first level port, the at least one received data packet including a root-id, the method further comprises:

determining that the root-id identifies a node within the subset associated with the receiving area border node;

replacing the root-id with the unique identifier of the subset associated with the receiving area border node; and forwarding the at least one data packet through the second level port.

9. The method of claim 3, wherein responsive to determining that the multicast packet is to be forwarded over at least one of the first level ports, the method further comprises:

responsive to determining that the root-id identifies another subset in the first area served by the receiving area border node, dropping the at least one received data packet; and responsive to determining that the root-id does not identify another subset in the first area served by the receiving area border node:

replacing the root-id with a different root-id; and forwarding the at least one data packet through the subset associated with the receiving area border node.

10. The method of claim 3, wherein the at least one received data packet is a unicast packet including a single destination address, the destination address identifying a node in the first area not associated with a subset of the receiving area border node, the method further comprises:

responsive to receiving the at least one data packet on a first level port, forwarding the at least one data packet through a different first level port; and responsive to receiving the at least one data packet on a second level port, forwarding the at least one data packet through the second level port towards another area border node.

11. An area border node for use in a packet communication network, the packet communication network including at least one first area defined by a first level, each first area including a first plurality of nodes interconnected by a first set of links, each first area interconnected through at least one area border node to a second area defined by a second level, the area border node comprising:

at least one first level port connected to each first area, the at least one first level port configured to receive data packets from and transmit data packets to the corresponding first area;

a second level port connected to the second area, the second level port configured to receive data packets from and transmit data packets to the second area;

at least one processor electrically connected to the at least one first level port and to the second level port, responsive to receiving a multicast packet at a second level port, the multicast packet including a header having a root-id identifying a root of a multicast tree, the processor is configured to:

examine the root-id of the multicast packet;

determine whether the multicast packet is to be forwarded on at least one of the first level ports of the area border node; and responsive to determining that the multicast packet is to be forwarded over at least one of the first level ports, substituting a different root-id into the packet before initiating forwarding of the packet over the at least one first level port.

12. The area border node of claim 11, further comprising:

at least one memory electrically connected to at least one processor, the at least one memory including:

a first forwarding information base ("FIB") associated with the at least one first level port; and a second forwarding information base ("FIB") associated with the second level port;

wherein the at least one processor is configured to:

forward a data packet received on the at least one first level port according to the first FIB; and forward a data packet received on the second level port according to the second FIB.

13. The area border node of claim 11, wherein at least one first area is serviced by more than one area border node, the processor is further configured to divide the at least one first area into a group of subsets by transmitting an advertisement for a link to a pseudo node representing the second area into its associated first areas through the at least one first level port, the group of subsets including an amount of subsets equal to an amount of area border nodes servicing the at least one first area, each subset associated with a specific area border node, the subset associated with the area border node including only nodes having a shortest path to the associated area border node, the advertisement including an associated metric greater than half a maximal diameter of the associated first areas.

14. The area border node of claim 13, wherein a unique identifier is assigned to each subset, the unique identifier for one subset included in the advertisement as a root-id.

15. The area border node of claim 14, wherein responsive to receiving a multicast packet at a first level port, the multicast packet including a header having a root-id identifying a root of a multicast tree, the at least one processor is further configured to:

determine that the root-id identifies a node within the subset associated with the receiving area border node;

replace the root-id with the unique identifier of the subset associated with the receiving area border node; and forward the at least one data packet through the second level port.

16. The area border node of claim 13, wherein responsive determining that the multicast packet is to be forwarded over at least one of the first level ports, the processor is further configured to:

responsive to determining that the root-id identifies another subset in the first area served by the area border node, drop the at least one received data packet; and responsive to determining that the root-id does not identify another subset in the first area served by the area border node:

replace the root-id with a root-id for a second level pseudo node; and forward the at least one data packet through the subset associated with the area border node.

17. The area border node of claim 13, wherein responsive to receiving a unicast packet including a single destination address, the destination address identifying a node in the first area not associated with a subset of the area border node, the processor is further configured to:

responsive to receiving the at least one data packet on a first level port, forward the at least one data packet through a different first level port; and responsive to receiving the at least one data packet on the second level port, forward the at least one data packet through the second level port towards another area border node.

18. A packet communication system comprising:

at least one first area, each first area configured as an link state protocol controlled Ethernet network area, each first area including a first plurality of nodes interconnected by a first set of links; and a second area configured as a link state protocol controlled Ethernet network area, the second area including a second plurality of nodes interconnected by a second set of links, the second area interconnected to each first area;

at least one area border node interconnecting the second area to each first area, the at least one border node configured to serve two or more disjoint first areas, each area border node including:

a second level port connected to the second area, the second level port configured to receive data packets from and transmit data packets to the second area;

at least one first level port operable connected to each first area, the at least one first level port operable to receive data packets from and transmit data packets to the corresponding first area;

at least one processor electrically connected to the second level port and to the at least one first level port, responsive to receiving a multicast packet at a second level port, the multicast packet including a header having a root-id identifying a root of a multicast tree, at least one processor is configured to:

examine the root-id of the multicast packet;

determine whether the multicast packet is to be forwarded on at least one of the first level ports of the area border node; and responsive to determining that the multicast packet is to be forwarded over at least one of the first level ports, substituting a different root-id into the packet before initiating forwarding of the packet over the at least one first level port.

19. The packet communication network of claim 18, wherein at least one first area is serviced by more than one area border node, the at least one first area is partitioned into a group of subsets, the group of subsets including an amount of subsets equal to an amount of area border nodes servicing the corresponding first area, each subset associated with a respective area border node, the subset associated with the area border node including only nodes having a shortest path to the associated area border node.

20. The packet communication network of claim 19, wherein the area border node represents in an advertisement transmitted into its associated first areas through the at least one first level port that there is a link to a pseudo node representing the second area, the advertisement including an associated metric greater than half a maximal diameter of the associated first areas.

* * * * *